J. KELLEY.
PLATFORM SCALE.
No. 19,061.   Patented Jan. 5, 1858.
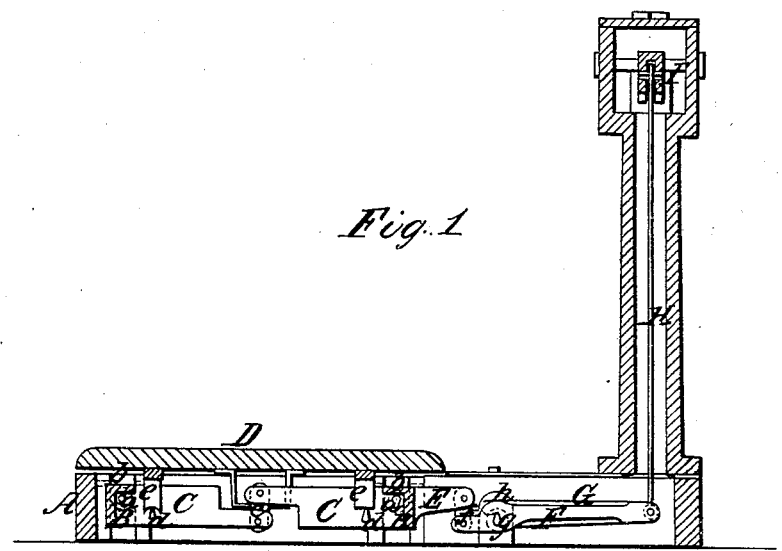
Fig. 1
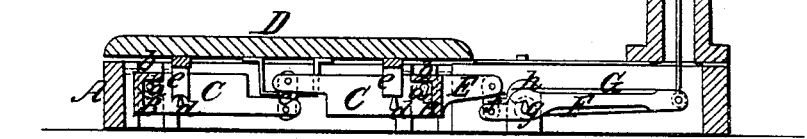
Fig. 2.
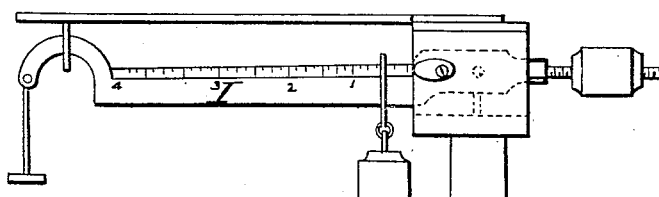
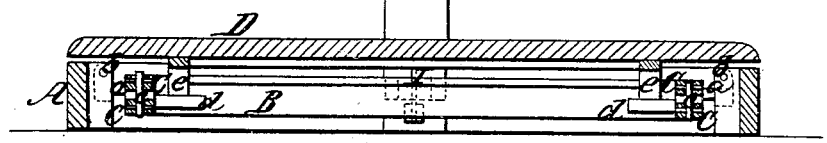

UNITED STATES PATENT OFFICE.

JAMES KELLY, OF SAG HARBOR, NEW YORK, ASSIGNOR TO HIMSELF AND JOHN SHERRY, OF SAME PLACE.

PLATFORM-SCALES.

Specification of Letters Patent No. 19,061, dated January 5, 1858.

*To all whom it may concern:*

Be it known that I, JAMES KELLY, of Sag Harbor, in the county of Suffolk and State of New York, have invented a new and useful Improvement in Platform-Scales; and I do hereby declare that the following is a full, clear, and exact description of the same, reference being had to the annexed drawings, making a part of this specification, in which—

Figure 1, is a transverse vertical section of my improvement, the plane of section being through the center. Fig. 2, is a longitudinal vertical section of ditto, the plane of section being through the center.

Similar letters of reference indicate corresponding parts in the two figures.

This invention consists in combining the weighing bars by linking together the extremities of the arms of said bars, when the said arms and bars are arranged in respect to each other as hereinafter set forth.

To enable those skilled in the art to fully understand and construct my invention, I will proceed to describe it.

A, represents a horizontal rectangular frame within which the bars B, B, are placed, one at each side of the frame. The ends of these bars are pivoted with knife-edged projections $a$, which rest in suspended bearings $b$, in the ends of the frame A.

At each end of each bar B, an arm C, is attached, said arms being at right angles with the bars B, and projecting inward or toward each other, the ends of the arms at each end of the bars being connected by a link $c$. To the inner ends of the arms C, near their junction with the bars B, knife-edged bearings $d$, are placed.

D, is the platform which has four vertical studs or projections $e$, attached to its under surface, one near each corner. These studs or projections rest upon the knife-edged bearings $d$.

To the outer side of one of the bars B, and at its center, there is attached an arm E, the outer end of which is connected by a link $f$, with a lever F. This lever has a knife-edged projection $g$, passing through it, which rests in bearings $h$. This lever F and arm E, are fitted within a box G, attached to the frame A. To the outer end of the lever F, a vertical rod H, is pivoted and the upper end of this rod is connected with the scale beam I, see Fig. 1.

From the above description it will be seen that the bars B, and arms C, and the arm E, lever F, and rod H, form the connection between the scale beam I, and platform D, and it will be seen that the platform has a short vibration or but little motion, and if the weight upon the platform D, bears upon one projection $d$, more than on the others, it will not affect the perfect operation of the device, because the arms C, of the two bars B, B, are connected and the pressure or weight will be transmitted equally to all the bearings.

I do not claim to be the inventor of weighing bars having arms projecting therefrom at right angles, for they are old. Neither do I claim, broadly, the linking together of the arms of weighing machines. But to the best of my knowledge and belief, it is new to combine the weighing bars by linking together the extremities of their arms, when the latter are arranged in respect to each other and to their bars as herein shown. By this arrangement and combination, new and useful results are obtained, prominent among which is an increased steadiness in the platform of the machine.

In my machine, the bars B being combined together by the linking of their arms C; said bars cannot vibrate independently as in other machines. For example, in the devices of E. A. Hibbard, 1835; Grolman and Holtsclaw, 1852; and W. Ensworth, 1849; the arms are arranged at angles of about 45° to their bars. In other words the arms are arranged crosswise; each pair meeting together in the center, and being linked at the point of meeting to another cross-beam or bar which extends back and connects with the scale beam. Each bar, with its arms, is thus to a great extent left independent. But in my machine, the ends of the arms being arranged at right angles to their bars and linked directly together; one set of bars and arms tends to steady the other set. There is the same advantage of steadiness in having the arms arranged, at right angles, and linked to each other, instead of meeting in the center, that exists in a four-wheeled vehicle over one having three wheels.

What I claim and desire to secure by Letters-Patent, is:

The combination of the bars B, by linking together the extremities of the arms C, when the said bars and arms are arranged in respect to each other as herein set forth.

JAMES KELLY.

Witnesses
 JNO. SHERRY,
 JAMES H. PRICE.